United States Patent
Cohen et al.

(10) Patent No.: US 9,804,952 B1
(45) Date of Patent: Oct. 31, 2017

(54) APPLICATION DEBUGGING IN A RESTRICTED CONTAINER ENVIRONMENT

(71) Applicant: Red Hat, Inc., Raleigh, NC (US)

(72) Inventors: William Eden Cohen, Cary, NC (US); Vincent Boen Batts, Raleigh, NC (US); Jeremy Eder, Garner, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/345,157

(22) Filed: Nov. 7, 2016

(51) Int. Cl.
*G06F 9/44* (2006.01)
*G06F 11/36* (2006.01)

(52) U.S. Cl.
CPC ............ *G06F 11/3644* (2013.01); *G06F 8/70* (2013.01)

(58) Field of Classification Search
CPC .............................. G06F 11/3644; G06F 8/70
USPC .................................................. 717/124–167
See application file for complete search history.

(56) References Cited

U.S. PATENT DOCUMENTS

| | | | | |
|---|---|---|---|---|
| 5,953,530 A * | 9/1999 | Rishi | ................... | G06F 11/3636 714/38.13 |
| 6,502,102 B1 * | 12/2002 | Haswell | .............. | G06F 11/3664 |
| 7,032,213 B1 * | 4/2006 | Lupu | ................... | G06F 11/3644 714/E11.207 |
| 8,272,048 B2 | 9/2012 | Cooper et al. | | |
| 8,561,032 B2 | 10/2013 | Baron | | |
| 8,966,438 B2 * | 2/2015 | Chamberlain | ............ | G06F 8/34 705/37 |
| 9,326,134 B2 | 4/2016 | Ahuja et al. | | |
| 9,367,415 B1 * | 6/2016 | Lachwani | ............. | G06F 11/362 |
| 2001/0027387 A1 * | 10/2001 | Miyake | ............... | G06F 11/3636 703/22 |
| 2008/0127292 A1 * | 5/2008 | Cooper | ................... | G06F 21/53 726/1 |
| 2012/0102468 A1 * | 4/2012 | Lefurgy | .............. | G06F 11/3636 717/128 |
| 2012/0167052 A1 * | 6/2012 | Fjeldstad | ............ | G06F 11/3664 717/125 |
| 2012/0291102 A1 * | 11/2012 | Cohen | ................... | G06F 21/629 726/4 |

(Continued)

FOREIGN PATENT DOCUMENTS

| | | |
|---|---|---|
| CN | 102722434 B | 1/2015 |
| WO | WO2016004929 A1 | 1/2016 |

OTHER PUBLICATIONS

Krammer, Bettina, Matthias S. Müller, and Michael M. Resch. "Runtime checking of MPI applications with MARMOT." Mini-Symposium Tools Support for Parallel Programming, ParCo. 2005. pp. 1-8.*

(Continued)

*Primary Examiner* — Satish Rampuria
(74) *Attorney, Agent, or Firm* — Haynes and Boone, LLP (57) ABSTRACT

An example method of debugging an application running in a container includes detecting, by a kernel, a system call from an application running in a container. The method also includes performing a capability check based on detection of the system call. The capability check provides a set of capabilities used by the system call. The method further includes associating the system call with the set of capabilities and providing debug information based on the application run in the container. The debug information includes the association between the system call and the set of capabilities.

17 Claims, 6 Drawing Sheets

(56) References Cited

U.S. PATENT DOCUMENTS

| | | | |
|---|---|---|---|
| 2015/0106572 A1* | 4/2015 | Stone .................. | G06F 11/3644 |
| | | | 711/147 |
| 2015/0135167 A1* | 5/2015 | Berk .................. | G06F 11/3644 |
| | | | 717/128 |

OTHER PUBLICATIONS

Beckett, David. "The design and implementation of the Redland RDF application framework." Computer Networks 39.5 (2002): pp. 577-588.*

Anderson, Thomas E., et al. "Scheduler activations: Effective kernel support for the user-level management of parallelism." ACM Transactions on Computer Systems (TOCS) 10.1 (1992): pp. 53-79.*

*Running SystemTap inside an Unprivileged Docker Container*, http://stackoverflow.com/questions/38799272/running-systemtap-inside-an-unbrivileged-docker-container.

*Docker + Nginx-Systemtap-Toolkit* #24, Nov. 26, 2015, https://github.com/openresty/nginx-systemtap-toolkit/issues/24.

Eugene Teo, *Systemtap: Working with System Monitoring Scripts*, Oct. 13. 2015, http://cloudacademy.com/blog/systemtap-monitoring-scripts/.

Brendan Gregg, Brendan Gregg's Blog; *Linux eBPF Stack Trace Hack*, Jan. 18, 2016, www.brendangregg.com/bloq/2016-01-18/ebpf-stack-trace-hack.html.

Eric Paris, Friendlier EPERM—Request for input, Jan. 9, 2013, https://sourceware.org/ml/libc-alpha/2013-01/msg00293.html.

* cited by examiner

FIG. 6

APPLICATION DEBUGGING IN A RESTRICTED CONTAINER ENVIRONMENT

BACKGROUND

The present disclosure generally relates to computing devices, and more particularly to application debugging.

Platforms exist for developing, shipping, and running applications. For example, a platform may allow developers to separate their applications from the infrastructure and treat the infrastructure like a managed application. The platform may help a developer ship software code faster, test faster, deploy faster, and shorten the cycle between writing and running the code. The platform may combine kernel containerization features with workflows and tooling that help the developer manage and deploy applications. The platform may provide a way to run an application securely isolated in a container.

A container is a self-contained execution environment and may share the kernel of the host operating system with other containers. The lightweight nature of containers, which run without the extra load of a hypervisor, may result in better use of hardware. Additionally, the isolation and security allow the developer to run many containers simultaneously on a machine. Surrounding the container are tool(s) and a platform that can help the developer place applications (and supporting components) into containers, distribute and ship those containers to others for further development and testing, and deploy those applications to the production environment, whether it is in a local data center or the cloud.

BRIEF SUMMARY

Methods, systems, and techniques for debugging an application running in a container that restricts one or more system calls and/or one or more capabilities are provided.

An example method of debugging an application running in a container includes detecting, by a kernel, a system call from an application running in a container. The method also includes performing a capability check based on detection of the system call. The capability check provides a set of capabilities used by the system call. The method further includes associating the system call with the set of capabilities. The method also includes providing debug information based on the application run in the container. The debug information includes the association between the system call and the set of capabilities and provides the user with a list of capabilities used by each of the applicable system calls.

An example system for debugging an application running in a container includes a monitor that monitors a set of system calls from an application. The application runs in a container that restricts one or more system calls or one or more capabilities. The monitor detects a system call from a first process identified by a first process identifier. The system also includes a container manager that determines whether the first process identifier is related to the application. If the first process identifier is related to the application, the container manager performs a capability check that provides a set of capabilities used by the system call. The container manager provides debug information based on the application run in the container. The debug information includes one or more system calls from the application and each system call's corresponding set of capabilities.

An example machine-readable medium includes a plurality of machine-readable instructions that when executed by one or more processors is adapted to cause the one or more processors to perform a method including: detecting, by a kernel, a set of system calls from an application running in a container; for each system call of the set of system calls: (i) determining a set of capabilities in accordance with invocation of the respective system call; and (ii) associating the respective system call with the set of capabilities; and providing debug information based on the application run in the container, the debug information including the association between one or more system calls and the set of capabilities used by the respective system call.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

I. Overview
II. Example Computer Architecture
III. Example Process Flow
   A. Monitor One or More Processes Run in a Restricted Container
   B. Determine a Set of Capabilities Used by a System Call from an Application
   C. Provide Debug Information
IV. Example Script
V. Example Methods

I. Overview

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

A platform may enable developers to develop on containers running applications and services. A container is an isolated processing space that can exist on top of a virtual machine or on top of actual hardware. A container may offer software that creates virtual environments mimicking a full virtual machine. The container may be viewed as a lightweight virtual machine that is used to create environments and may share the operating system (OS) with the host machine, preserving resources. A container is typically lightweight and as small as possible (especially in the production environment). Because of its small size, the container may be devoid of troubleshooting and debugging tools for the application. In an example, if the developer desires to debug the application running inside the container (e.g., production container), the developer may use standard OS commands to install troubleshooting or debugging tools.

An application may be run in an unrestricted container that allows a full set of system calls and capabilities to be invoked by the application. A system call provides an interface to the OS services and may use one or more capabilities. A capability is a distinct unit of permission(s) that can be independently enabled or disabled. A capability may allow for finer-grained granting of permissions. In some examples, the kernel is allocated a 32-bit or 64-bit bitmask to define these capabilities, and each bit in the bitmask indicates whether the container restricts a particular capability. In an example, the OS is LINUX®, which divides the privileges associated with superuser into distinct units, known as capabilities, which can be independently enabled and disabled. A capability may be, for example, the ability to send raw Internet Protocol (IP) packets, access raw IP packets, bind to particular ports, mount a file, access some file system operations (e.g., create new device nodes, change the owner of files, or alter attributes), or module load.

Some problems may arise when running an application in an unrestricted container. For example, an unrestricted container does not restrict any system calls or capabilities of the full set of system calls and capabilities. Accordingly, an application running in an unrestricted container is not restricted from invoking any system calls or capabilities and may thus gain unrestricted access to the kernel and exploit a vulnerability in the system.

This security problem may be overcome by running an application in a restricted container that enforces a policy restricting certain system calls and/or capabilities. The security landscape of a restricted container is less permissive than that of an unrestricted container. Restricting actual system calls that a container may make may increase security because a kernel exploit may rely on making system calls to rarely used parts of the kernel. A restricted container restricts one or more system calls and/or one or more capabilities of the full set of system calls and capabilities. An application running in a restricted container is restricted from invoking the restricted system call(s) and capability(ties). A restricted system call or capability is unavailable for invocation from within the restricted container. For example, a restricted system call or capability may be disabled in the restricted container such that an application is not given permission to invoke the restricted system call or the restricted capability. Accordingly, the restricted container may provide additional protection to limit what a containerized application may do while running inside it. For example, a restricted container may restrict the amount of resources used by an application running in the container to allow for better system management. Additionally, the lightweight nature of a restricted container, which may run without the extra load of a hypervisor, may result in better use of hardware.

An application may be migrated from an unrestricted container to a restricted container. Accordingly, some applications that are not originally designed to run in a restricted container are run in a restricted container. For example, some application developers may not focus on security or how to debug an application. A problem may arise if the security landscape of a restricted container is less permissive than the developer may have originally intended when writing the application. For example, if an application attempts to invoke a restricted system call, the restricted system call fails and an error occurs. If an application attempts to invoke a restricted capability, the system call that uses the restricted capability fails and an error occurs. Although the cause of error is different in these scenarios, the same error may be returned to a user, making it difficult to resolve the issue. Nebulous reasons for the failure may be returned to the user. Accordingly, an application may execute successfully in an unrestricted container, but fail when executed in a restricted container in an odd and difficult way to resolve. Debugging these failures due to restricted capabilities and system calls may be difficult because the error returned based on these system call failures may be generic and triggered by any number of causes in addition to the restriction of capabilities and system calls.

This problem of the user being provided with nebulous reasons for the error may be solved by testing for and identifying the particular restricted system calls or capabilities invoked by the application run in the container. When debugging applications running in a restricted container, it may be desirable to provide cohesive and understandable error codes that provide a user with meaningful information regarding reasons for failures. For example, it may be desirable to determine which system calls and/or capabilities an application running in an unrestricted container is attempting to invoke. Any problems related to the restricted system calls or capabilities may be reported. By providing the user with this information, she may be better able to determine what the application running in the container is doing. For example, the user may be able to determine the system calls attempted by the application and which capabilities are being used by the application. Such information may be helpful for users in understanding the application's behavior and how to fix the problem.

Another problem may arise if the application is provided to the user in executable code form. In this example, the user may be limited in her ability to understand an application's behavior and what it does because the executable code is not human readable. The application binary may be provided by a third party. In another example, an application developer may build the code on existing libraries and may be unaware of the system calls and/or capabilities that the library uses. In another example, the application developer may build an application on top of another application, which itself may be built on top of another application. In this example, it may be hard to distinguish the layers and the actions of each layer. When an individual executable is created, the executable may specify certain capabilities that are invoked. Unfortunately, the user may be unable to figure out the system calls or capabilities invoked based on possession of the executable code.

This problem of not understanding the binary code's behavior and its cause of failure may be solved by identifying the root of the error. For example, the present disclosure may provide techniques to test whether the application attempted to invoke a restricted system call or capability in the restricted container. If so, rather than a nebulous error being returned to the user, a more precise and meaningful error indicating its root cause is returned to the user. In particular, the user may be made aware that the application attempted to invoke a restricted system call or a restricted capability, thus causing an error. The present disclosure may avoid whole code audits, which may be difficult if the user does not have the source code available for viewing. For example, the user may better understand how to run containers successfully along with the application's behavior.

Accordingly, failures may be solved without use of the source code. Additionally, the user may tailor the container to be restricted just enough to successfully run the application.

The present disclosure provides techniques for debugging an application running in a container. The application may run in a container that restricts one or more system calls and/or one or more capabilities, and report problematic uses. Unless specifically stated otherwise, as apparent from the following discussion, it is appreciated that throughout the description, discussions utilizing terms such as "determining," "storing," "detecting," "receiving," "sending," "performing," "executing," "identifying," "modifying," "associating," "providing," "invoking," and "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

II. Example Computer Architecture

Figure 1:
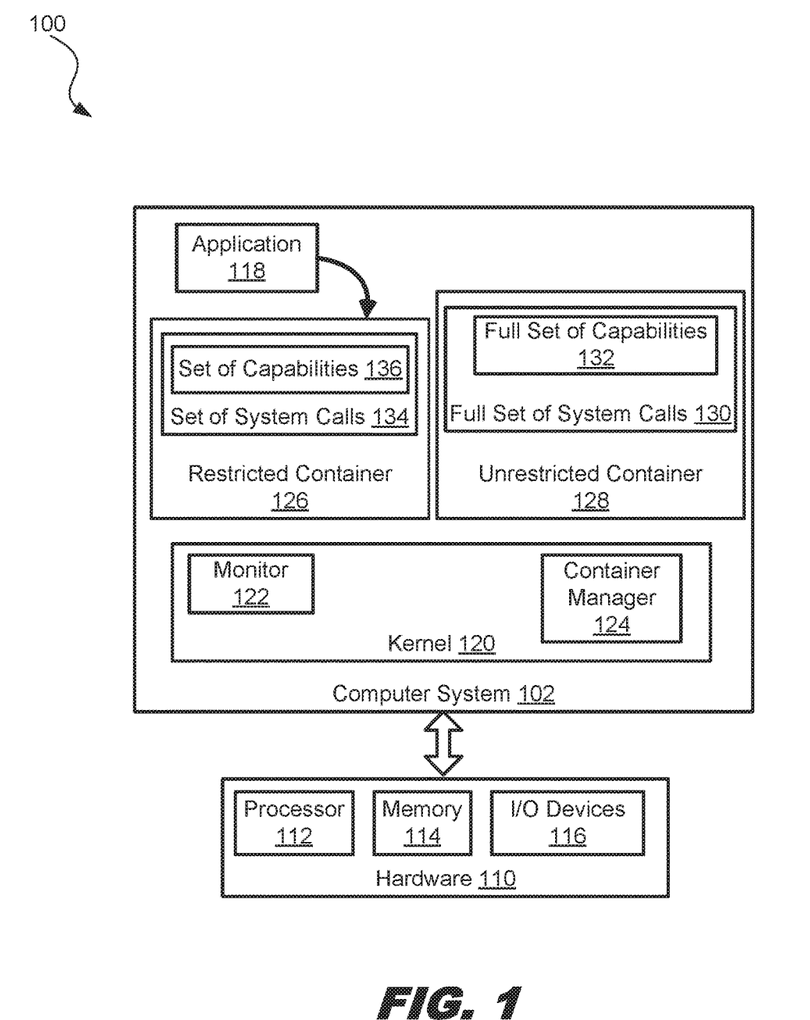
FIG. 1 is a diagram illustrating an example system for debugging an application running in a restricted container.

FIG. 1 is a diagram illustrating an example system 100 for debugging an application running in a restricted container. System 100 may be used for automating the creation and distribution of containerized computer program applications and for executing computer program applications using containerization. In an example, system 100 may provide a mechanism to run an application securely isolated in a container. The isolation and security allow developers to run many containers simultaneously on a single host.

System 100 includes a computer system 102 that may be coupled over a network (not shown). The network may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Computer system 102 is coupled to hardware 110 such as a processor 112 for executing software (e.g., machine-readable instructions) and using or updating data stored in memory 114. Hardware 110 may include more than one processor 112. A "processor" may also be referred to as a "CPU" or "physical processor" herein. A processor shall refer to a device capable of executing instructions encoding arithmetic, logical, or I/O operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

Memory 114 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The software may include an operating system, a hypervisor, and various other software applications. Hardware 110 may include other I/O devices 116.

Computer system 102 includes a kernel 120 that serves as a central component for facilitating communication between software applications 118 and hardware devices (e.g., processor 112, memory 114, and I/O devices 116) of a machine. For example, kernel 120 may be responsible for facilitating operating system functions and various management tasks (e.g., process management, disk management, and memory management).

Additionally, computer system 102 includes a restricted container 126 and an unrestricted container 128. A container (e.g., an unrestricted container or a restricted container) may run one or more applications on a developer's local host, on physical or virtual machines in a data center, or in the cloud. A container may provide additional protection to limit what actions may be performed from within the container. For example, a container may restrict the amount of resources used by the container to allow for better system management. Application 118 may run in restricted container 126, which allows a set of system calls 134 to be invoked by the application. Set of system calls 134 may use a set of capabilities 136. Application 118 may also be run in unrestricted container 128, which allows a full set of system calls 130 to be invoked by the application. Full set of system calls 130 may use a full set of capabilities 132. A capability is a set of permissions to perform a particular action in kernel 120. An example of a capability may be a permission to allow access to raw packets, to mount a file system, etc. A super user with administrative privileges may set the system calls allowed or disallowed by restricted container 126. A system call or capability that is restricted may also be referred to as a disallowed system call or capability, respectively. Additionally, the super user may set the capabilities allowed or disallowed by restricted container 126.

Although computer system 102 is illustrated as including one restricted container and one unrestricted container, it should be understood that computer system 102 may include more than one restricted container and/or more than one unrestricted container. In some examples, computer system 102 includes more than two containers. Additionally, computer system 102 may have multiple instances of the computer system 102 on computer system 102. Moreover, restricted containers running in computer system 102 may have different system call and/or capability restrictions relative to each other.

Application 118 may be run in restricted container 126 rather than unrestricted container 128 for various reasons. For example, restricted container 126 may restrict one or more system calls of full set of system calls 130 or one or more capabilities of full set of capabilities 132 from being invoked from within restricted container 126. Full set of system calls 130 may be a superset of set of system calls 134. Additionally, full set of capabilities 132 may be a superset of set of capabilities 136. Accordingly, an application may be unable to invoke particular system calls or use particular capabilities if the application is running in restricted container 126 compared to running in unrestricted container 128.

Restricted container 126 allows set of system calls 134 to be invoked by the application running inside the restricted container. If application 118 attempts to invoke a system call that is restricted by restricted container 126, the system call fails and an error is returned to the user. Without the teachings of the present disclosure, the reasons conveyed to the user for the error may be nebulous. For example, the error code returned may be an "EPERM" error, but does not provide much information regarding why the system call failed. An application may be debugged to better determine whether a particular capability or system call restriction was the root cause of the system call failure. In some examples, the process may be run in an unrestricted container to avoid affecting the behavior of the application, get information on the system calls and capabilities used using the monitoring, and then place the application in a container that does not restrict the system calls and capabilities required for normal operation. The debug information may be helpful for users to better understand and debug the application.

The present disclosure provides debugging techniques that overcome this problem of nebulous error codes. In the example illustrated in FIG. 1, kernel 120 includes a monitor 122 and a container manager 124. As further explained below, as application 118 runs in a container, monitor 122 detects a set of system calls from an application running in the container. Additionally, container manager 124 provides debugging information based on the application's behavior.

III. Example Process Flow

Figure 2:
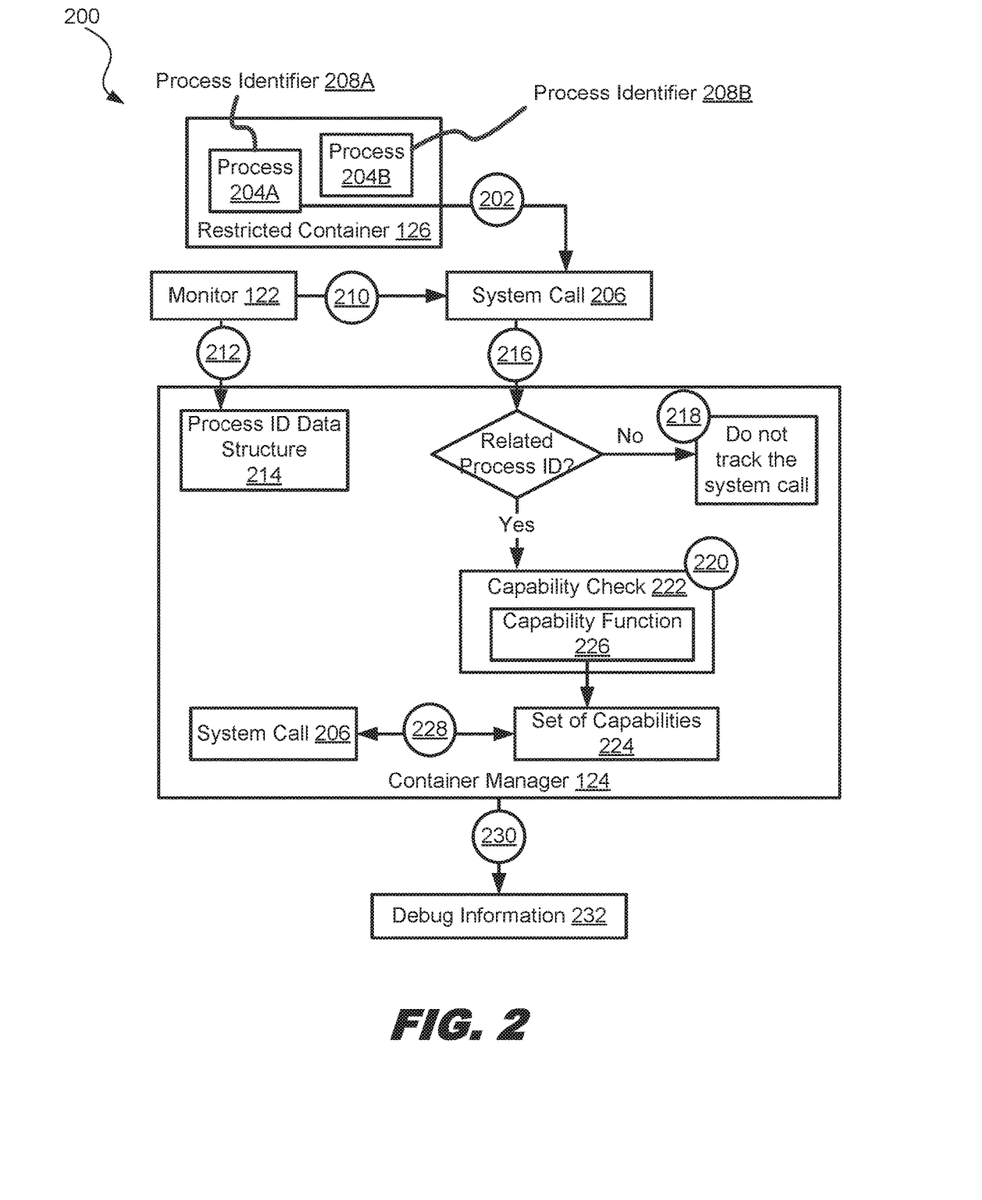
FIG. 2 is an example process flow for debugging an application running in a restricted container.

FIG. 2 is an example process flow 200 for debugging an application running in a restricted container. One or more applications and/or processes may run within restricted container 126. A process is an executing instance of an application (e.g., application 118 or another application) running in restricted container 126. In the present disclosure, the term "application" and "process" may be used interchangeably. For example, reference to a process running in a container may refer to an application running in the container.

A. Monitor One or More Processes Run in a Restricted Container

In FIG. 2, processes 204A and 204B are running in restricted container 126. At action 202, process 204A attempts to invoke a system call 206 that uses a set of capabilities. Process 204A is assigned a process identifier (ID) 208A that uniquely identifies the process, and process 204B is assigned a process ID 208B that uniquely identifies the process. Restricted container 126 may restrict one or more system calls and/or one or more capabilities from being invoked within the container. If an application attempts to invoke a restricted system call from within restricted container 126, the system call is unavailable and fails. Additionally, if an application attempts to invoke a restricted capability from within restricted container 126, the capability is unavailable and the system call that uses the restricted capability fails.

Monitor 122 may monitor computer system 102 and the applications running on it. In an example, each time an application makes a system call into kernel 120, monitor 122 may detect the system call. At action 210, monitor 122 detects system call 206 from process 204A running in restricted container 126. In an example, monitor 122 detects a set of system calls (including system call 206) from one or more applications running on computer system 102. Because computer system 102 may run more than one application, it may be desirable to narrow which system calls are processed further by container manager 124. For example, if a user is interested in debugging application 118, it may be desirable for only those system calls from application 118 and its children processes to be further processed. In this way, the user is not inundated with information unrelated to application 118, the application of interest. Monitor 122 may record system calls from application 118.

At action 212, monitor 122 identifies process IDs assigned to particular processes and inserts the process IDs into a process ID data structure 214. As monitor 122 continues to monitor applications running on computer system 102, monitor 122 may insert process IDs of processes related to application 118 into process ID data structure 214. A process is related to application 118 if it is an executing instance of application 118 or a child spawned from an executing instance of application 118. In this way, container manager 124 may limit reporting of restricted capabilities and system calls to a particular process and its descendants to focus the user on the application of interest.

Each application of interest may have its own process ID data structure 214. In an example, process ID data structure 214 is application 118's process data structure. In this example, if process 204A is related to application 118, monitor 122 inserts process ID 208A into process ID data structure 214 and keeps track of process IDs related to application 118. Monitor 122 may arrange the process IDs in a tree-like structure that has the process ID identifying the executing instance of application 118 as the root and spawned child process IDs branching off from the root. If a first process is spawned from a second process, the first process is a child of the second process, and the first process's process ID may be a child node of the second process's process ID, and so on. Additionally, if process IDs can be traversed along a common path, they are related. In keeping with the aforementioned example, if a third process is spawned from the first process, the first and third processes are children of the second process.

At action 216, container manager 124 determines whether process 204A is related to application 118, the application of interest. Container manager 124 determines whether process 204A is related to application 118 by comparing process ID 208A, which identifies process 204A, to an initial process ID identifying an executing instance of application 118 and/or to child process ID(s) of the initial process ID. In an example, process ID data structure 214 is a tree-like data structure, and container manager 124 traverses the branches of the data structure up to the root. Along its path to the root, if container manager 124 has still not identified the process ID identifying an executing instance of application 118 or a child spawned from an executing instance of application 118, then process 204A is not related to application 118. In contrast, if container manager 124 identifies the process ID identifying an executing instance of application 118 or a child spawned from an executing instance of application 118 along the path to the root, then process 204A is related to application 118. Although a tree-like structure was used in this example, it should be understood that other data structures may be used to indicate the relationship between parent and child processes.

B. Determine a Set of Capabilities Used by a System Call from an Application

If process 204A is not related to application 118, process flow may proceed to action 218, in which container manager 124 does not track system call 206. In contrast, if process 204A is related to application 118, process flow proceeds to action 220, in which container manager 124 performs a capability check 222 based on detection of system call 206. In this example, capability check 222 is performed after it is determined that process ID 208A is related to application 118. Capability check 222 provides a set of capabilities 224 that system call 206 uses and thus application 118 has attempted to invoke from within restricted container 126. System call 206 uses set of capabilities 224 in order to complete the system call. Application 118 has attempted to invoke set of capabilities 224 in accordance with invocation of system call 206. In some examples, dynamically instrumenting capability check 222 and system call returns in kernel 120 with container manager 124 allows very clear determination of the capabilities used by the application's system calls. A system call that has failed may be referred to as a failed system call. A system call may fail for various reasons. For example, a system call may fail because restricted container 126 restricts the system call from being invoked within the restricted container, restricts a capability used by the system call from being invoked within the restricted container, the application running in restricted container 126 is corrupt, or other reasons.

In some examples, container manager 124 performs capability check 222 by invoking a capability function 226 that accepts one or more parameters. In an example, capability function 226 accepts one or more capability IDs, each capability ID identifying a particular capability of the full set of capabilities 132. For each received capability ID, capability function 226 returns a value indicating whether the capability identified by the capability ID is used by system call 206. In this way, container manager 124 may provide information on which system call(s) and/or capability/ies were used based on system call 206. Container manager 124 receives the return value(s) from capability function 226.

In an example, container manager 124 identifies full set of capabilities 132, which is a superset of set of capabilities 224. In this example, for each capability of set of capabilities 224, container manager 124 identifies a capability ID of the respective capability; invokes capability function 226 using the capability ID as a parameter, and receives a return value from capability function 226, where the return value indicates whether application 118 has attempted to invoke the respective capability in accordance with system call 206.

At action 228, container manager 124 associates system call 206 with its corresponding set of capabilities 224. It may be helpful to associate a system call with its corresponding capabilities because this may provide information to the user regarding the application 118's behavior and its attempted capability invocations. By associating the system call with its used capabilities, container manager 124 may determine which capabilities were used based on which system calls. If a system call succeeds, the system call and the capabilities used by the system call are not restricted by restricted container 126. If a system call fails, the system call and/or capabilities used by the system call may be restricted by restricted container 126. If a system call fails and the system call and capabilities used by the system call are not restricted by restricted container 126, the system call failed for reasons other than the restrictions enforced by restricted container 126.

In some examples, container manager 124 provides a list of system calls and/or capabilities that are restricted by restricted container 126. Different containers setups may have different restrictions. Container manager 124 may limit the list to include a set of restricted capabilities and system call that match the restricted environment for the container. In this way, the user may focus on the capabilities and system calls that will present a problem within the particular restricted container environment.

C. Provide Debug Information

At action 230, container manager 124 provides debug information 232 based on application 118 run in restricted container 126 to a user. Debug information 232 may provide meaningful information to the user regarding application 118's run in restricted container 126. For example, debug information 232 may include the system calls made by application 118 along with their corresponding capabilities. Accordingly, the user may be able to determine the set of capabilities used by each system call invoked by application 118. In some examples, debug information 232 may be displayed on a screen, saved to a memory, or sent to a printer coupled to the user's computing device.

The user may determine the system calls and/or capabilities restricted by restricted container 126. Debug information 232 may provide information on which system calls were invoked by application 118 and also list the capabilities used by each of these system calls using the association information provided by action 228. Debug information 232 may indicate which system call(s) and/or capability/ies were used by application 118 and/or failed. In some examples, monitor 122 monitors whether system calls invoked by application 118 (its starting process or new child processes) fail or succeed. For example, when a system call returns, monitor 122 may determine whether the system call was successful or failed, along with a set of capabilities used by the particular system call. Accordingly, debug information 232 may provide additional information that allows a user to work the issue further by providing valuable feedback. For example, a user reviewing debug information 232 may identify system calls and/or capabilities that application 118 attempted to invoke.

In an example, container manager 124 determines whether system call 206 has failed. In response to a determination that system call 206 has failed, container manager 124 may determine whether restricted container 126 restricts one or more capabilities of set of capabilities 224. Container manager 124 may make note of this information when providing debug information 232 to the user. For example, if restricted container 126 restricts one or more capabilities of set of capabilities 224, debug information 232 includes a list of the one or more of these restricted capabilities to the user.

In an example, application 118 attempted to invoke a restricted system call or capability. In this example, the user may configure restricted container 126 to remove the particular restriction, thus enabling this system call and/or capability to be invoked from within restricted container 126. The user may decide that one or more restricted system calls and/or one or more capabilities should be enabled in restricted container 126, and thus modify the container permissions to enable use of the particular system call(s) and/or capability/ies. In an example, the user provides input to container manager 124, and in response to the user input, container manager 124 modifies restricted container 126 to allow one or more restricted capabilities. In this example, before restricted container 126 is modified, restricted container 126 restricted application 118 from invoking the one or more restricted capabilities. By removing these particular restrictions from restricted container 126, application 118 may run successfully within restricted container 126, with a minimum amount of permissions to operate and providing for finer tuning of the container. In this way, the environment in which application 118 runs may provide for better security while ensuring successful execution of application 118.

Additionally, in developing application 118, the developer may not have been aware of all the system calls or capabilities invoked by application 118. Accordingly, if feasible, the user may modify application 118 and remove this system call or capability from being invoked by application 118. In this example, the system call or capability may be unnecessary, and the user may accordingly modify application 118 to not invoke one or more of the restricted capabilities. These approaches may allow for application 118 to successfully run in restricted container 126, or would provide for fewer system call failures.

It should be understood that additional actions may be performed before, during, or after actions 204, 210, 212, 216, 218, 220, 228 and/or 230 discussed above. For example, process flow 200 may be implemented without action 216 and 218. In some examples, a system call does not use a capability. In an example, container manager 124 determines whether a system call uses a capability. If so, container manager 124 performs action 220 and thus performs capability check 222. If the system call does not use a capability, container manager 124 may skip actions 220 and 224 for the particular system call. In another example, container manager 124 implements the capability check 222 by determining whether the system call uses a capability. It should be understood that a set of capabilities may refer to zero or more capabilities or one or more capabilities.

IV. Example Script

An integrated development environment (IDE) provides a set of tools such as editing and debugging software for programmers. These tools are used to create and debug software programs. The IDE supports software development by providing a windowed system for source file editing, project management, and file interdependency management and debugging. Many types of programming tools exist that are not part of an IDE and are used on a stand-alone basis. An example of a stand-alone tool is Systemtap. Systemtap is an instrumentation system that provides a scripting language and command line interface for monitoring system performance.

Figure 3:
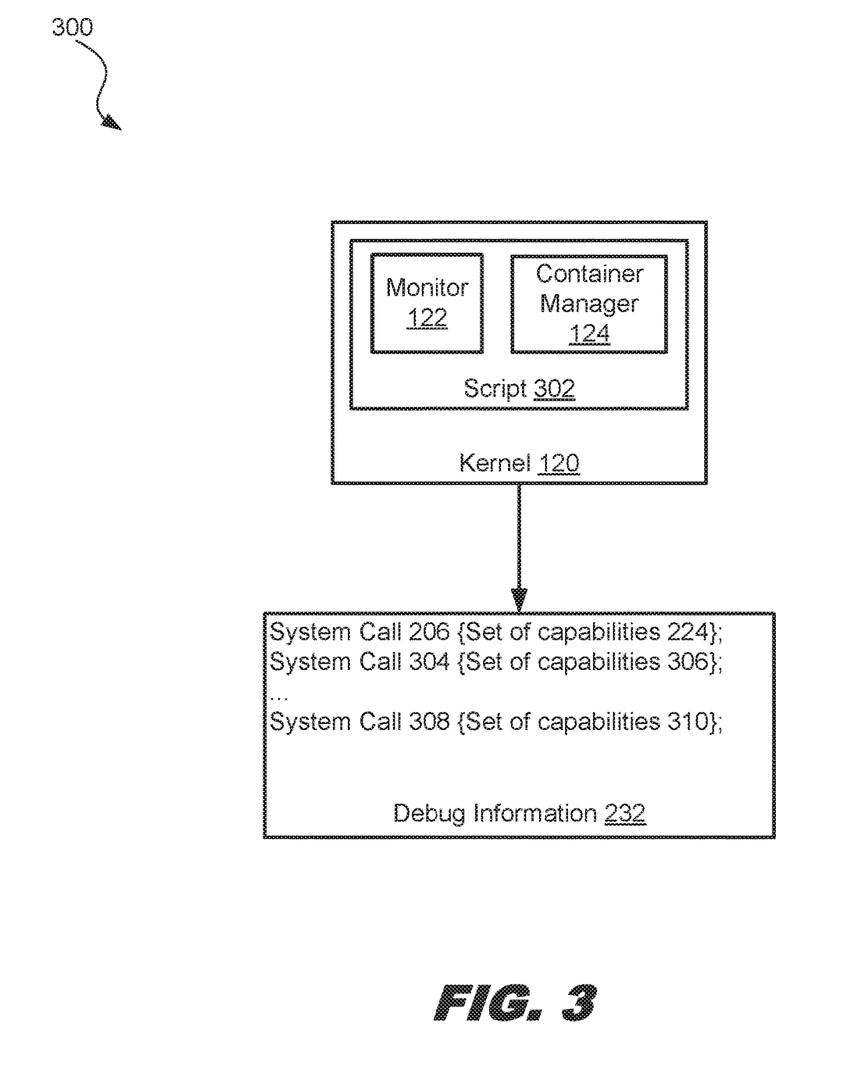
FIG. 3 is an example block diagram for debugging the application using a script.

In some examples, monitor 122 and container manager 124 are implemented using a script. FIG. 3 is an example block diagram 300 for debugging application 118 using a script 302. In the example illustrated in FIG. 3, script 302 includes monitor 122 and container manager 124. A user may install the script and point it to start at a particular process running within a container. Application 118 may start executing while the script monitors the application and its system calls into kernel 120. The script may continue monitoring application 118 as it is running in restricted container 126.

In some examples, script 302 is a Systemtap script that runs inside kernel 120. Although in this example, Systemtap is described as being the technology that monitors the application, this is not intended to be limiting and it should be understood that other technologies that provide application monitoring are within the scope of the disclosure. Systemtap is a software development tool that allows collection of data from kernel 120 and user-space applications. Systemtap includes a library of predefined probes and functions for kernel 120 (e.g., tapsets) and a scripting language to perform on-the-fly data reduction. Systemtap's probing capabilities can be extended to user-space applications. For example, Systemtap can be used to define probes in a binary for the purpose of monitoring the execution of the binary by threads. The probes allow investigation of the operation of the program without the need to recompile or restart the program.

An application may have embedded markers, which expose selected names and values to the Systemtap scripts. A Systemtap script includes name events and handlers. An event and its corresponding handler may be collectively called a probe. A Systemtap script may have multiple probes. Whenever a specified event occurs, kernel 120 runs the handler as if it were a quick subroutine, then resumes. Examples of events include entering or exiting a method, a timer expiring, or the entire Systemtap session starting or stopping. As events occur on any processor, the compiled handlers run. A handler is a series of script language statements that specify the work to be done whenever the event occurs. This work may include extracting data from the event context, storing them into internal variables, or printing results.

Monitor 122 may insert probe points into application 118. For example, monitor 122 may insert a probe point on system return calls and capability checks (e.g., at capability function 226). Monitor 122 may record the results of the capability check for later use when returning from the system calls corresponding to the capability checks. For example, referring back to FIG. 2, system call 206 corresponds to capability check 222 because the capability check is being performed based on system call 206. In an example, container manager 124 determines whether some information is recorded for the capability check and associates the capability information with its corresponding system call at action 228. Referring back to FIG. 3, script 302 may dynamically monitor and record information as application 118 runs in restricted container 126. Dynamically instrumenting capabilities check 222 and system call returns in kernel 120 with a Systemtap script may allow for clear determination of the capabilities used by application 118's system calls. In some examples, script 302 continues to execute until application 118 has completed its run in restricted container 126 and then exits.

After exiting, script 302 may provide debug information 232 to a user. Debug information 232 may provide the system calls from application 118 along with each system call's used capabilities. For example, in FIG. 3, debug information 232 indicates that system call 206 was made by application 118 and uses set of capabilities 224, system call 203 was made by application 118 and uses set of capabilities 306, and system call 308 was made by application 118 and uses set of capabilities 310. Container manager 124 may further analyze this information to determine application 118's behavior and to determine whether restricted container 126 restricts system call 206 or its used set of capabilities 224, system call 203 or its used set of capabilities 306, and/or system call 308 or its used set of capabilities 310.

In some examples, script 302 limits the notifications in debug information 232 to a set of used capability/ies and/or system calls that match the restricted environment for the container. In this way, the user may focus more easily on the capabilities and system calls that are more likely to present a problem within the particular restricted container environment. In some examples, script 302 limits the reporting of restricted capabilities and/or system calls to a particular process and its descendants to focus the user on the application that she is planning to place in a restricted container and further to avoid distractions by the many other processes running on the system. In some examples, script 302 is used in a diagnostic manner on an application that is currently running in a restricted container to more quickly identify the root cause of a problem that is due to restricted capabilities and/or system calls.

Although a script was provided as an example, this is not intended to be limiting and other technologies may be used to implement features of the present disclosure. In an example, monitor 122 and container manager 124 are implemented using LINUX® extended Berkeley Packet Filter (eBPF) and perf trace points.

V. Example Methods

Figure 4:
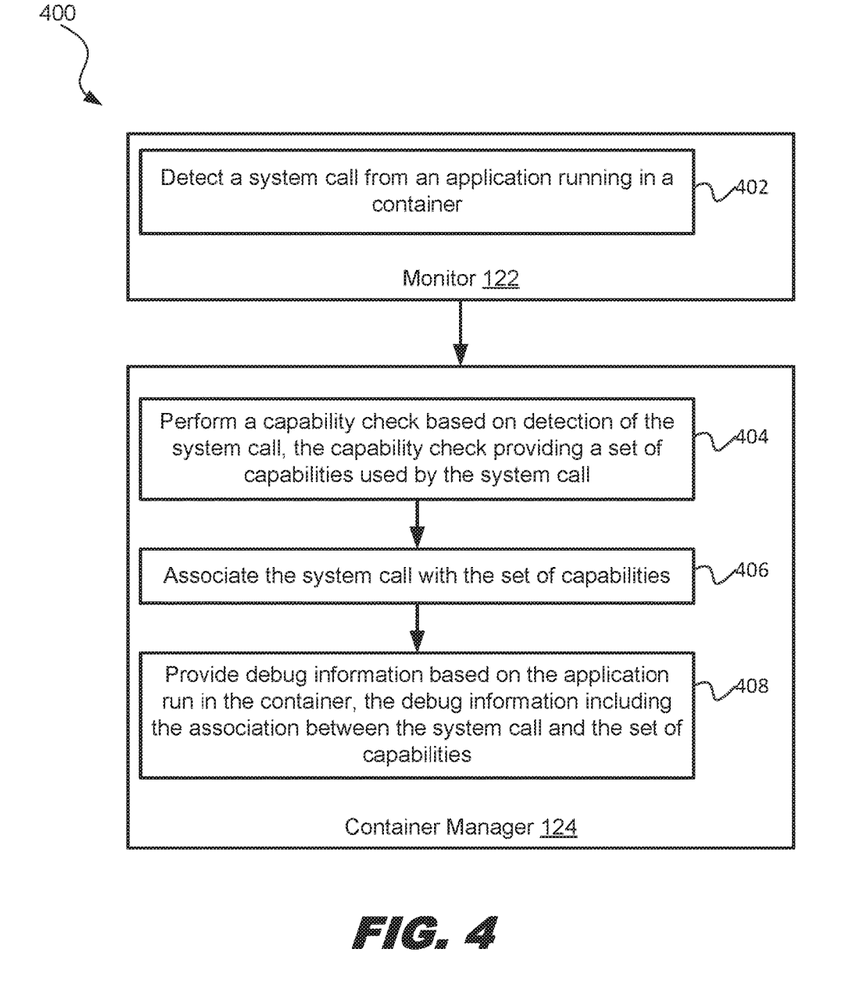
FIG. 4 is a flowchart illustrating an example method of debugging an application running in a container.

FIG. 4 is a flowchart illustrating an example method 400 of debugging an application running in a container. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, blocks of method 400 may be performed on system 100 illustrated in FIG. 1. The order of the actions described below may also be performed according to alternative orderings. In yet other examples, additional actions may be added and actions that are described may be removed.

Method 400 includes blocks 402, 404, 406, and/or 408. In block 402, monitor 122 detects system call 206 from application 118 running in restricted container 126. In block 404, container manager 124 performs capability check 222 based on detection of system call 206, the capability check 222 providing set of capabilities 224 used by system call 206. In block 406, container manager 124 associates system call 206 with set of capabilities 224. In block 408, container manager 124 provides debug information 232 based on application 118 run in restricted container 126, the debug information including the association between system call 206 and set of capabilities 224. It is understood that additional blocks may be performed before, during, or after blocks 402, 404, 406, and/or 408 discussed above.

Figure 5:
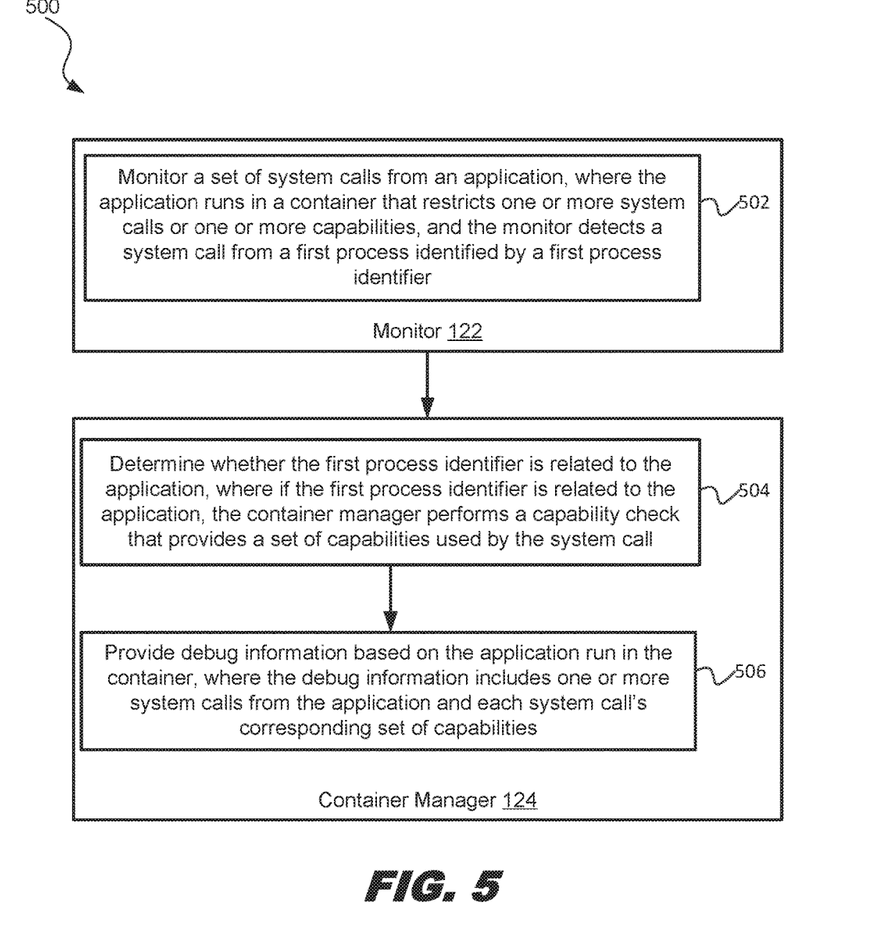
FIG. 5 is a flowchart illustrating another example method of debugging an application running in a container.

FIG. 5 is a flowchart illustrating an example method 500 of debugging an application running in a container. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, blocks of method 500 may be performed on system 100 illustrated in FIG. 1. The order of the actions described below may also be performed according to alternative orderings. In yet other examples, additional actions may be added and actions that are described may be removed.

Method 500 includes blocks 502, 504, and/or 506. In block 502, monitor 122 monitors a set of system calls from an application, where the application runs in a container that restricts one or more system calls or one or more capabilities, and the monitor detects a system call from a first process identified by a first process identifier. In block 504, container manager 124 determines whether the first process identifier is related to the application, where if the first process identifier is related to the application, the container manager performs a capability check that provides a set of capabilities used by the system call. In block 506, container manager 124 provides debug information based on the application run in the container, wherein the debug information includes one or more system calls from the application and each system call's corresponding set of capabilities. It is understood that additional blocks may be performed before, during, or after blocks 502, 504, and/or 506 discussed above.

Figure 6:
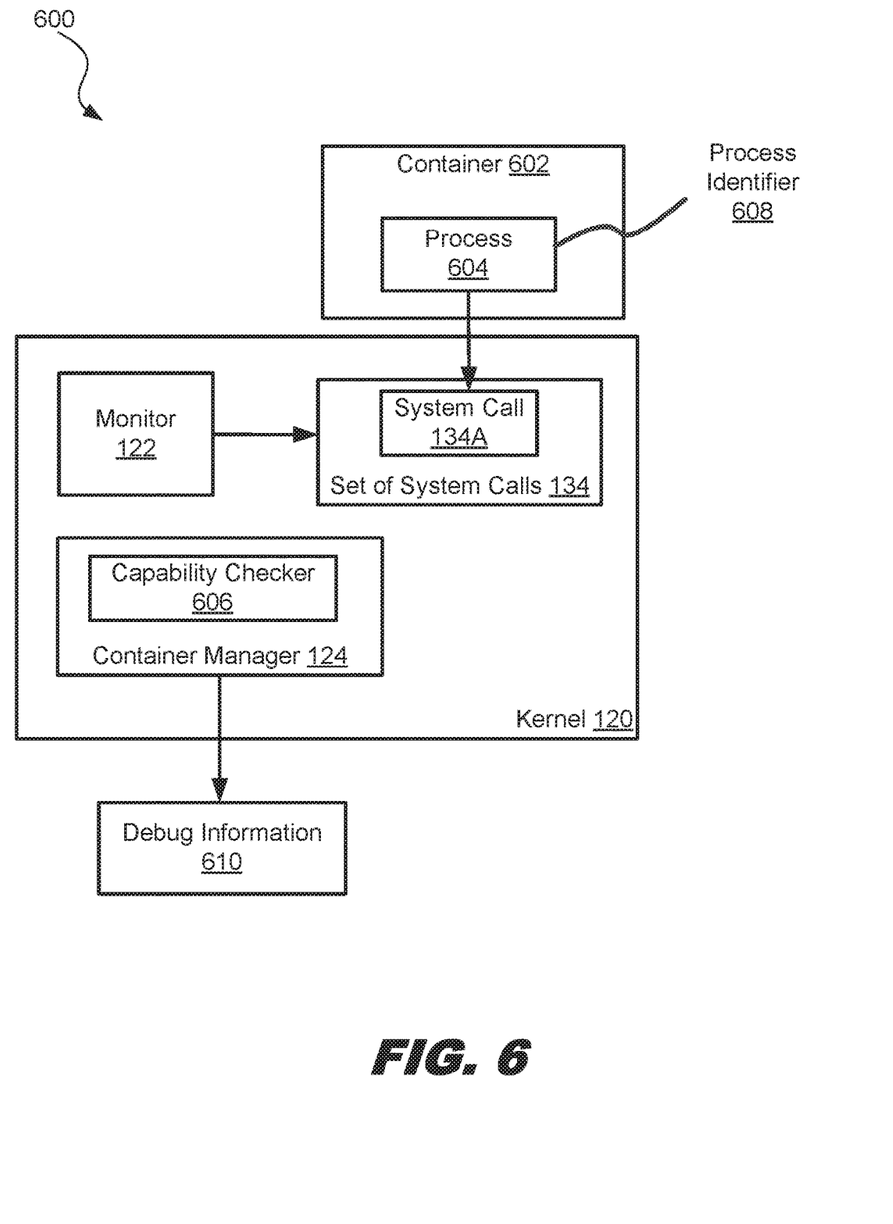
FIG. 6 is a diagram illustrating an example system for debugging an application running in a container.

FIG. 6 is a diagram illustrating an example system 600 for debugging an application running in a container. In FIG. 6, monitor 122 monitors set of system calls 134 from an application, wherein the application runs in a container 602 that restricts one or more system calls or one or more capabilities. Set of system calls 134 may be invoked by one or more processes. Monitor 122 detects system call 134A of set of system calls 134 from a process 604 identified by a process identifier 608. Although a single process is illustrated as running in container 602, it should be understood that more than one process may run in the container. In some examples, monitor 122 may detect other system calls from other processes running in container 602.

Container manager 124 includes a capability checker 606 that provides a set of capabilities used by a system call. In some examples, container manager 124 determines whether process identifier 608 is related to the application. If process identifier 608 is related to the application, capability checker 606 performs a capability check that provides a set of capabilities used by system call 134A. Container manager 124 provides debug information 610 based on the application run in container 602, where debug information 610 includes one or more system calls from the application and each system call's corresponding set of capabilities. Debug information 610 may provide valuable information to the user such that she is aware of which system calls an application invokes within container 602 and also which capabilities are used by the particular system calls. Each system call may be associated with the set of capabilities it uses.

As discussed above and further emphasized here, FIGS. 1-6 are merely examples, which should not unduly limit the scope of the claims.

In various implementations, system 100 may be a client or server computing device including one or more processors 112. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

The computing device (e.g., system 100) may include a bus or other communication mechanism for communicating information data, signals, and information between various components of computer system. The components may include an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (such as a keyboard, keypad, mouse, etc.). An audio I/O component may also be included to allow a user to use voice for inputting information by converting audio signals into information signals. Audio I/O component may allow the user to hear audio.

A transceiver or network interface may transmit and receive signals between the client or server computing device and other devices via a communications link to a network. In an example, the transmission is wireless, although other transmission mediums and methods may also be suitable. Processor 112, which may be a micro-controller, digital signal processor (DSP), or other processing component, processes these various signals, such as for display on the client device or transmission to other devices via the communications link. Processor 112 may also control transmission of information, such as cookies or IP addresses, to other devices.

Components of the client or server computing device may also include a system memory component (e.g., RAM), a static storage component (e.g., ROM), and/or a disk drive. Computer system 102 performs specific operations by processor 112 and other components by executing one or more sequences of instructions contained in the system memory component (e.g., memory 114). Logic may be encoded in a computer readable medium, which may refer to any medium that participates in providing instructions to processor 112 for execution. Such a medium may take many forms, including but not limited to, non-volatile media, volatile media, and transmission media. In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in a non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In some examples, execution of instruction sequences (e.g., method 400 or 500) to practice the present disclosure may be performed by the client or server computing device. In various other examples of the present disclosure, a plurality of host machines coupled by the communications link to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks, actions, or steps described herein may be changed, combined into composite blocks, actions, or steps, and/or separated into sub-blocks, sub-actions, or sub-steps to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of debugging an application running in a container, comprising:
    detecting, by a kernel, a system call from an application running in a container, wherein the container restricts one or more system calls or one or more capabilities;
    determining whether a process that made the system call is related to the application, wherein the process is related to the application if the system call is from an initial process of the application or a child of the initial process;
    in response to a determination that the process is related to the application, performing a capability check based on detection of the system call, the capability check providing a set of capabilities used by the system call;
    associating the system call with the set of capabilities; and
    providing debug information based on the application run in the container, the debug information including the association between the system call and the set of capabilities.

2. The method of claim 1, further comprising:
    determining whether the container restricts the system call from being invoked, wherein if the container restricts the system call from being invoked, the debug information indicates that the container restricts the system call from being invoked.

3. The method of claim 1, further comprising:
    determining whether the container restricts one or more capabilities of the set of capabilities from being invoked, wherein if the container restricts one or more capabilities of the set of capabilities from being invoked, the debug information indicates that the container restricts the one or more capabilities of the set of capabilities from being invoked.

4. The method of claim 1, wherein performing the capability check includes:
    identifying a second set of capabilities that is a superset of the first set of capabilities; and
    for each capability of the second set of capabilities:
        identifying a capability identifier of the respective capability;
        invoking a capability function using the capability identifier as a parameter; and receiving a return value from the capability function, the return value indicating whether the application has attempted to invoke the respective capability in accordance with the system call.

5. The method of claim 1, further comprising:
determining whether the system call has failed; and
in response to a determination that the system call has failed, determining whether the container restricts one or more capabilities of the set of capabilities, wherein if the container restricts one or more capabilities of the set of capabilities, the debug information includes a list of the one or more restricted capabilities.

6. The method of claim 5, further comprising:
modifying the application to not invoke one or more restricted capabilities.

7. The method of claim 1, further comprising:
modifying the container to allow one or more restricted capabilities, wherein before modifying the container, the container restricts the application from invoking the one or more restricted capabilities.

8. The method of claim 1, further comprising:
detecting, by the kernel, a set of system calls from the application running in the container, the set of system calls including the first system call; and
recording the set of detected system calls.

9. The method of claim 1, wherein the application has attempted to invoke the set of capabilities in accordance with invocation of the system call.

10. A system for debugging an application running in a container, comprising:
a non-transitory memory; and
one or more hardware processors coupled to the non-transitory memory and configured to read instructions from the non-transitory memory to cause the system to perform operations comprising:
detecting a system call from a first process identified by a first process identifier;
determining whether the first process identifier is related to an application, wherein the application runs in a container that restricts one or more system calls or one or more capabilities, and wherein the first process identifier is related to the application if the first process identifier is assigned to an initial process that is an executing instance of the application or a child of the initial process;
if the first process identifier is related to the application, performing a capability check that provides a set of capabilities used by the system call, and
providing debug information based on the application run in the container, wherein the debug information includes one or more system calls from the application and each system call's corresponding set of capabilities.

11. The system of claim 10, wherein the detecting, the performing, and the providing is implemented using a script.

12. The system of claim 11, wherein the script is a Systemtap script.

13. The system of claim 12, wherein a probe point is located at the capability check and a probe point is located in the application at a return of the system call.

14. The system of claim 10, wherein the application has attempted to invoke the set of capabilities in accordance with invocation of the system call.

15. The system of claim 10, the operations further comprising:
determining whether the container restricts the system call from being invoked, wherein if the container restricts the system call from being invoked, the debug information indicates that the container restricts the system call from being invoked.

16. The system of claim 10, the operations further comprising:
determining whether the container restricts one or more capabilities of the set of capabilities from being invoked, wherein if the container restricts one or more capabilities of the set of capabilities from being invoked, the debug information indicates that the container restricts the one or more capabilities of the set of capabilities from being invoked.

17. A non-transitory machine-readable medium comprising a plurality of machine-readable instructions that when executed by one or more processors is adapted to cause the one or more processors to perform a method comprising:
detecting, by a kernel, a set of system calls from an application running in a container, wherein the container restricts one or more system calls or one or more capabilities;
for each system call of the set of system calls:
determining whether a process that made the respective system call is related to the application, wherein the process is related to the application if the respective system call is from an initial process of the application or a child of the initial process;
in response to a determination that the process is related to the application, determining a set of capabilities in accordance with invocation of the respective system call; and
associating the respective system call with the set of capabilities; and
providing debug information based on the application run in the container, the debug information including the association between one or more system calls and the set of capabilities used by the respective system call.

* * * * *